(12) United States Patent
Boxwell et al.

(10) Patent No.: US 11,036,803 B2
(45) Date of Patent: Jun. 15, 2021

(54) RAPID GENERATION OF EQUIVALENT TERMS FOR DOMAIN ADAPTATION IN A QUESTION-ANSWERING SYSTEM

(71) Applicant: International Business Machines Corporation, Armonk, NY (US)

(72) Inventors: Stephen A. Boxwell, Columbus, OH (US); Keith G. Frost, Delaware, OH (US); Stanley J. Vernier, Grove City, OH (US); Kyle M. Brake, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 16/380,491

(22) Filed: Apr. 10, 2019

(65) Prior Publication Data

US 2020/0327170 A1    Oct. 15, 2020

(51) Int. Cl.
*G06F 16/9032* (2019.01)
*G06F 40/247* (2020.01)

(52) U.S. Cl.
CPC ...... *G06F 16/90332* (2019.01); *G06F 40/247* (2020.01)

(58) Field of Classification Search
None
See application file for complete search history.

(56) References Cited

U.S. PATENT DOCUMENTS

| 7,483,829 B2 | 1/2009 | Murakami et al. |
| 7,739,104 B2 | 6/2010 | Berkan et al. |
| 7,925,498 B1 | 4/2011 | Baker et al. |
| 8,374,859 B2 * | 2/2013 | Huang ................. G06F 40/247 704/231 |
| 2009/0112828 A1 | 4/2009 | Rozenblatt |
| 2013/0268260 A1 | 10/2013 | Lundberg et al. |
| 2014/0344261 A1 * | 11/2014 | Navta ................. G06F 16/951 707/723 |
| 2016/0180242 A1 * | 6/2016 | Byron ................. G06N 5/041 706/11 |
| 2016/0196504 A1 * | 7/2016 | Allen .................. G06N 20/00 706/11 |
| 2016/0232221 A1 * | 8/2016 | McCloskey .......... G06F 16/285 |
| 2016/0232222 A1 * | 8/2016 | McCloskey .......... G06F 16/951 |

(Continued)

OTHER PUBLICATIONS

Jurafsky et al., "Question Answering," Speech and Language Processing, Aug. 7, 2017, 19 pages.

(Continued)

*Primary Examiner* — Michael N Opsasnick
(74) *Attorney, Agent, or Firm* — Van Leeuwen & Van Leeuwen; Diana R. Gerhardt (57) ABSTRACT

An approach is provided that receives a question at a question-answering (QA) system. The received question includes one or more terms, and the question pertains to a subject matter domain that is supported by the QA system. Analyzing a number of expressions included in a set of question-answer pairs (QA pairs), with the QA pairs being ground-truths established to in support of the subject matter domain. The analysis identifies whether a selected term from the question is a synonym for any of the expressions. The expressions that are identified as synonyms are then used in a QA pipeline that generates one or more candidate answers to the received question.

11 Claims, 5 Drawing Sheets

(56) References Cited

U.S. PATENT DOCUMENTS

| | | | |
|---|---|---|---|
| 2016/0239740 A1* | 8/2016 | Baughman | G06N 20/00 |
| 2016/0240095 A1* | 8/2016 | Baughman | G06F 16/3344 |
| 2017/0116250 A1 | 4/2017 | Allen et al. | |
| 2017/0169354 A1* | 6/2017 | Diamanti | G06F 16/00 |
| 2017/0169355 A1* | 6/2017 | Boyer | G06N 5/04 |
| 2017/0293620 A1* | 10/2017 | Boguraev | G06F 16/353 |
| 2017/0293621 A1* | 10/2017 | Boguraev | G06F 16/2455 |
| 2018/0011837 A1* | 1/2018 | Beller | G06F 40/30 |
| 2018/0082211 A1* | 3/2018 | Allen | G06F 16/9535 |
| 2019/0095629 A1* | 3/2019 | Lee | G06N 3/04 |
| 2019/0138268 A1* | 5/2019 | Andersen | G06F 3/167 |

OTHER PUBLICATIONS

Dubey et al., "EARL: Joint Entity and Relation Linking for Question Answering over Knowledge Graphs," Cornell University, Jan. 16, 2018, 15 pages.

Sirts, "Question Answering an Dialog Systems"; Natural Language Processing: Lecture 15, Dec. 12, 2017, 82 pages.

Anonymously, "Automatic, In-Domain, Question/Answer-Set Generation," ip.com, IPCOM/000245124D, Feb. 10, 2016, 5 pages.

Anonymously, "A Self-Diagnosing Question Answering System," ip.com, IPCOM/000247244D, Aug. 17, 2016, 6 pages.

* cited by examiner

RAPID GENERATION OF EQUIVALENT TERMS FOR DOMAIN ADAPTATION IN A QUESTION-ANSWERING SYSTEM

BACKGROUND

In question answering (QA) systems, adapting to new domains is labor and time intensive. One particularly difficult area is in the identification of key jargon and synonyms used in the new domain. While traditional synonym sources are often used, such traditional sources do not account for particular jargon and terms used in a particular domain. Failure to identify key jargon and synonyms in a new domain can result in questions being answered incorrectly and can lead to additional labor and time needed to train the system regarding such domain-oriented synonyms.

SUMMARY

An approach is provided that receives a question at a question-answering (QA) system. The received question includes one or more terms, and the question pertains to a subject matter domain that is supported by the QA system. Analyzing a number of expressions included in a set of question-answer pairs (QA pairs), with the QA pairs being ground-truths established to in support of the subject matter domain. The analysis identifies whether a selected term from the question is a synonym for any of the expressions. The expressions that are identified as synonyms are then used in a QA pipeline that generates one or more candidate answers to the received question.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-5 describe an approach that identifies synonyms found in question-answer pairs (QA pairs) for terms that are found in a question submitted to a question-answering (QA) system. In QA systems, adapting to new domains is time and labor-intensive. One particular area of difficulty is identifying key jargon synonyms that appear in the new domain. The approach shown herein uses a candidate answer scorer and ground-truth QA pairs to identify new in-domain synonyms for domain adaptation.

Illustration of traditional system difficulty and support provided by the approach is readily shown through use of the following example. Suppose we have the following question submitted to a QA system:

"Who is the leader of the New England Patriots?"

Suppose further that the following passage is identified among the passages ingested to support this domain (e.g., American football, etc.):

"Tom Brady is the quarterback for the New England Patriots."

In a traditional system, the answer scorer generates trigrams from the question and looks for those trigrams in the passage. The trigrams from the question are:

FOCUS be leader
be leader of
leader of New England Patriots

Unfortunately, none of these trigrams appear in the passage. This it is not inherently known that "leader" and "quarterback" can be treated as equivalent (synonyms) in this particular domain. Because of this mismatch, the passage receives a score of zero from our trigram scorer, even though this passage is highly relevant.

In contrast, using the approach described herein, rather than scoring a passage based on these trigrams, the approach instead returns the tokens that would need to match in order for the answer to receive a perfect score, weighted according to a match function informed by features on those words. For example, a word might have syntactic features like "verb", "ven", "vpass". or "objpref" on a verb, and more features in common indicate a closer syntactic match. Alternately, for a simpler solution, the match function might be "1" if the candidate have the same part-of-speech. These are in turn used to generate synonym hypotheses. So in this case. we will receive "leader=? quarterback".

Now, suppose we have another passage:

"Tom Brady is the husband of Gisele Bündchen".

Our system will (erroneously) hypothesize the synonyms "leader=? husband" and "New England Patriots=? Gisele Bündchen".

These will also be added to the list of candidate synonyms.

Finally, all the candidate synonyms are aggregated and counted. leading to a list such as the following with the number of times each term was found to be a synonym in the QA pairs data listed in parentheses:

leader ?=quarterback (5)
captain ?=quarterback (4)
MVP ?=quarterback (2)
husband ?=quarterback (1)
Giselle Bündchen ?=New England Patriots (1)
Giselle Bündchen ?=Tom Brady (1)

The list of candidate synonyms can then be used with their relative strengths to score candidate answers, such as determining that a candidate answer of "Tom Brady is the leader of the New England Patriots" as being a better answer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
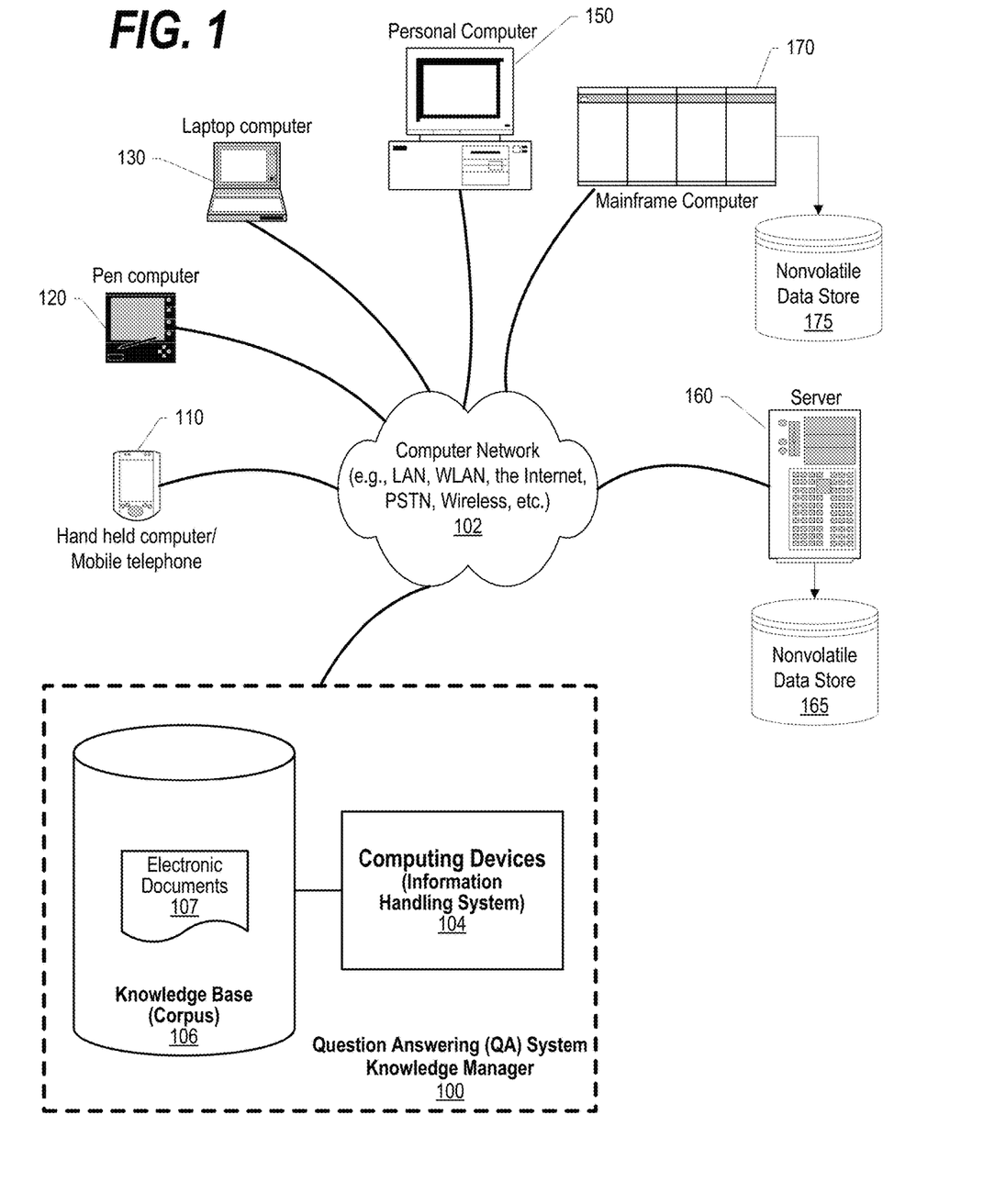
FIG. 1 depicts a network environment that includes a knowledge manager that utilizes a knowledge base.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
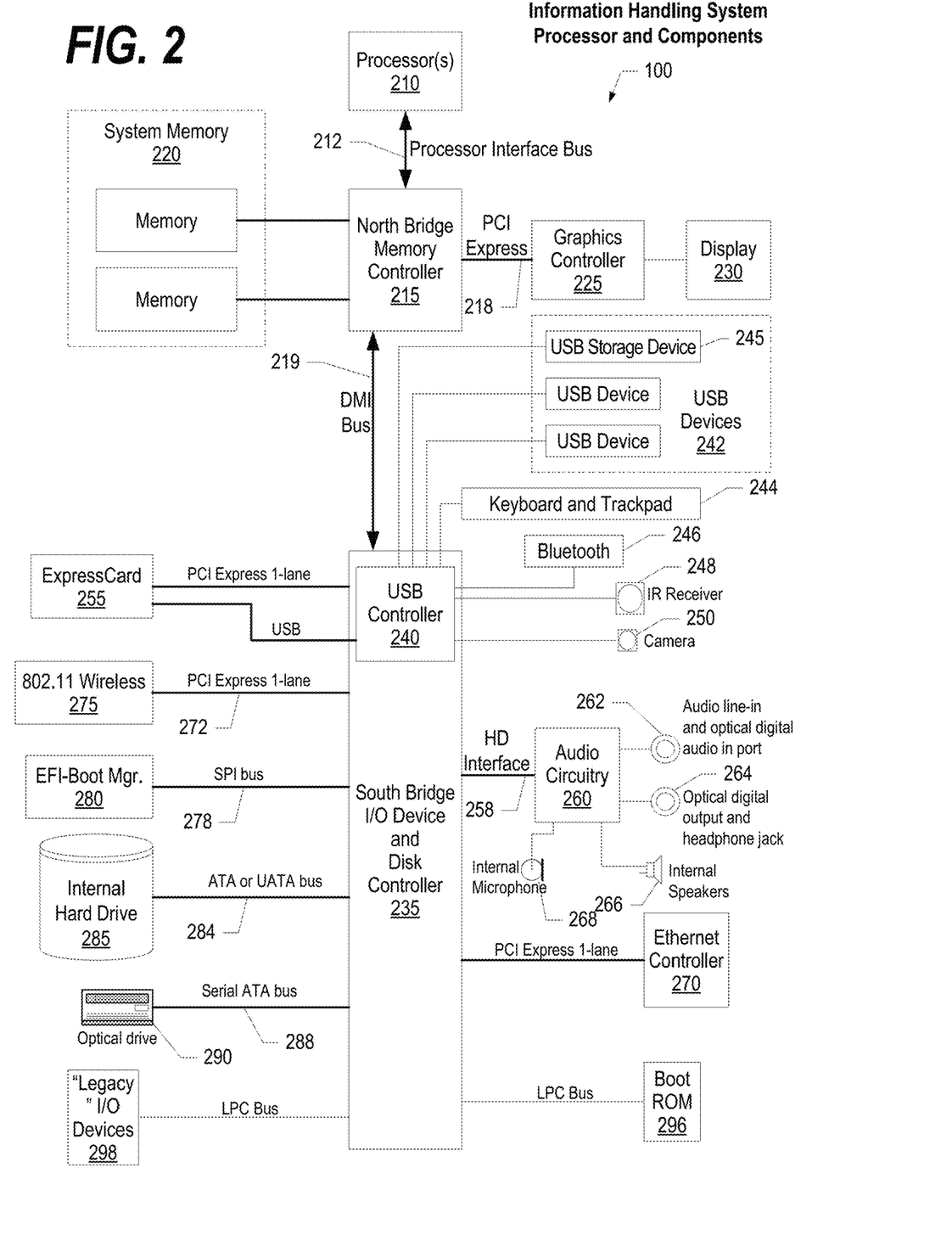
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212.

Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
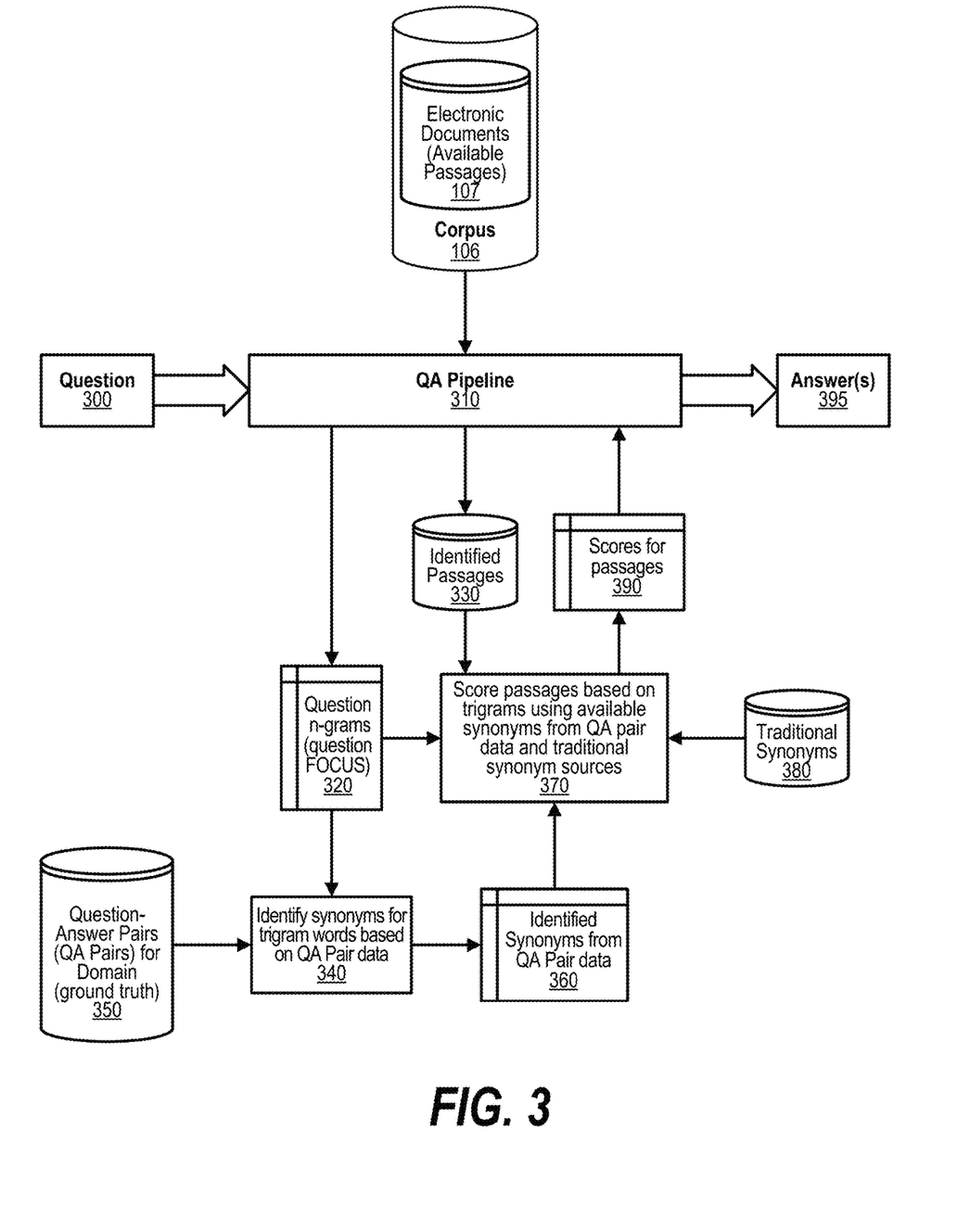
FIG. 3 is a component diagram that shows the various components included in a system that performs rapid generation of equivalent terms during domain adaptation in a question-answering system.

FIG. 3 is a component diagram that shows the various components included in a system that performs rapid generation of equivalent terms during domain adaptation in a question-answering system. Question 300 is input by a requestor, such as a user, and is received by the question-answering (QA) system where it is processed by QA pipeline 310. One stage in the QA pipeline processes the question into the various terms (n-grams) that are stored in memory area 320. One or more of these terms relates to a focus of the question that was input from the requestor. The terms of the question are used by process 340 to identify synonyms for the various terms based on question-answer pair (QA pair) data that is retrieved from data store 350. QA pair data is data used to establish "ground truths" for the domain. In the previous example, the domain might be related to American football or the New England Patriots. One possible QA pair might be "who is the quarterback of the New England Patriots?" as the question, with the answer in the QA pair being "Tom Brady." In the previous example, the user's question was "who is the leader of the New England Patriots?" and, using the example flow previously described, the QA pair data would be processed to provide that "quarterback" is a potential synonym for "leader" when dealing with the specific American football domain. However, in a traditional synonym lookup, such as in a traditional thesaurus, "quarterback" might not be listed as a synonym for "leader." The identified synonyms from the analysis of the QA pair data are stored in memory area 360.

Additionally, traditional synonyms are provided from traditional synonym data sources 380 (e.g., online thesaurus, etc.). Process 370 scores the identified passages from data store 370 using the n-grams (terms) from the question while also using synonyms found from the analysis of QA pair data with respect to the question terms as well as synonyms from traditional sources, such as an online thesaurus. Process 370 results in passages being scored based, in part, on the synonyms found from the processing of the data included in the QA pairs. These scored passages are stored in memory area 390.

After processing the scored passages from memory area 390, QA pipeline generates a set of one or more candidate answers 395 that might be ordered, or ranked, based on the relevant scores of the candidate answers. One or more of the highest ranked candidate answers are provided as answer(s) 395 to the question posed by the requestor.

One stage in the QA pipeline is the identification of passages relevant to the received question. In one embodiment, available passages 107 were previously ingested into the QA system and reside in corpus 106 where the passages can be more easily and quickly retrieved. The QA system identifies passages that are relevant to the input question which, in the depiction show, are stored in data store 330.

Figure 4:
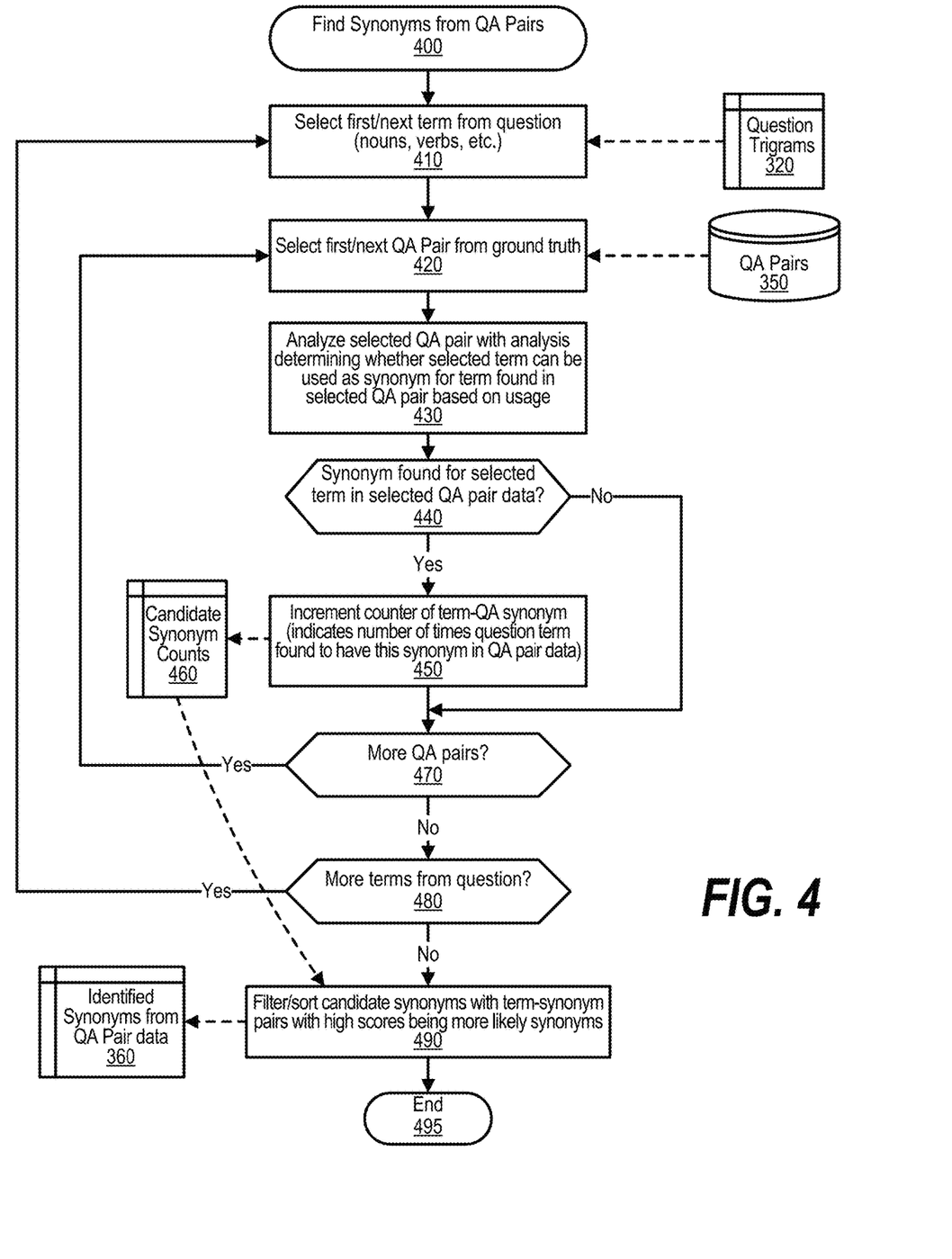
FIG. 4 is a depiction of a flowchart showing the logic used to identify equivalent terms from question answer (QA) pairs.

FIG. 4 is a depiction of a flowchart showing the logic used to identify equivalent terms from question answer (QA) pairs. FIG. 4 processing commences at 400 and shows the steps taken by a process that finds synonyms from question-answer pair (QA Pair) data. At step 410, the process selects the first term from a question received at a question-answering (QA) system, with terms being nouns, verbs, etc. The terms are retrieved from memory area 320. At step 420, the process selects the first QA Pair from a ground truth set of QA Pairs that was established by a subject matter expert (SME) for this particular domain (e.g., the domain of American football in the examples previously discussed, etc.). The QA pairs are retrieved from data store 350.

At step 430, the process analyzes the selected QA pair with the analysis determining whether the selected term from the question can be used as synonym for the expression found in the selected QA pair. In one embodiment, the analysis is based on usage of the term and expression in both the question and the selected QA pair. The process determines as to a synonym was found for the selected term in the selected QA pair data (decision 440). If a synonym was found for the selected term in the selected QA pair data, then decision 440 branches to the 'yes' branch whereupon, at step 450, the process increments a counter that keeps track of the term combined with the QA synonym expression (indicates number of times question term found to have this synonym (expression) in the set of QA pair data). This counter is stored in memory area 460 that keeps track of, for example, how many times "quarterback" can be used as a synonym for "leader" in the QA pair data. Returning to decision 440, if a synonym was not found for the selected term in the selected QA pair data, then decision 440 branches to the 'no' branch bypassing step 450.

The process determines whether there are more QA pairs to select and process from data store 350 (decision 470). If there are more QA pairs, then decision 470 branches to the 'yes' branch which loops back to step 420 to select and process the next QA pair from data store 350. This looping continues until all of the QA pairs have been processed, at which point decision 470 branches to the 'no' branch exiting the loop.

The process next determines as to whether there are more terms from question that need to be processed (decision 480). If there are more terms from question that need to be processed, then decision 480 branches to the 'yes' branch which loops back to step 410 to select and process the next term as described above. This looping continues until there are no more terms from the question needing to be processed, at which point decision 480 branches to the 'no' branch exiting the loop.

At step 490, the process filters and sorts the candidate synonyms stored in memory area 460 based on the number of times such candidate synonyms were found in the QA pair data. In one embodiment, high scores are noted as being more likely synonyms. In a further embodiment, those candidate synonyms receiving scores below a particular threshold might be filtered out as possible synonyms. FIG. 4 processing thereafter ends at 495.

Figure 5:
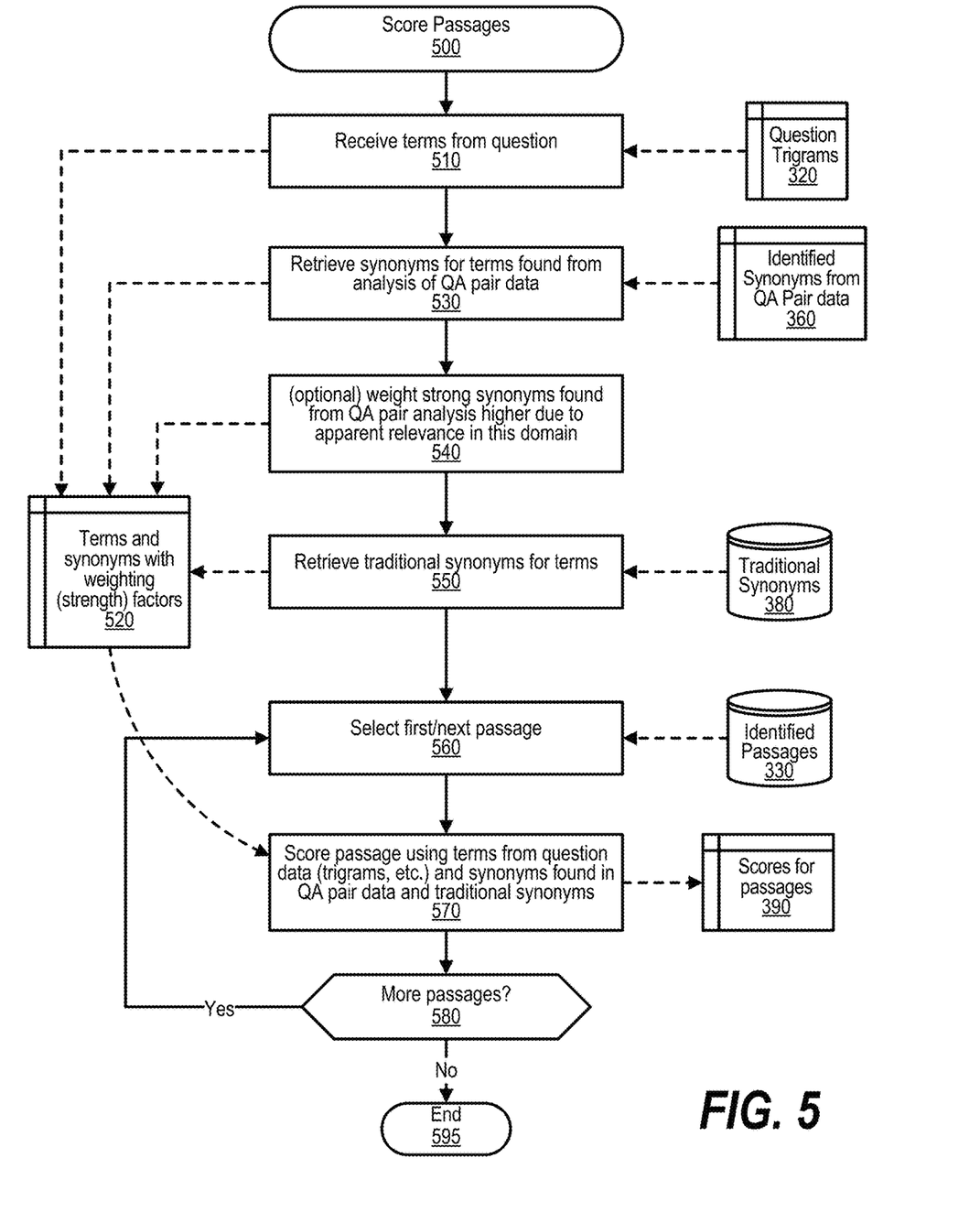
FIG. 5 is a depiction of a flowchart showing the logic used to score passages after identifying domain-based equivalent terms that were identified from the analysis of question answer (QA) pairs.

FIG. 5 is a depiction of a flowchart showing the logic used to score passages after identifying domain-based equivalent terms that were identified from the analysis of question answer (QA) pairs. FIG. 5 processing commences at 500 and shows the steps taken by a process that scores passages for use by a QA system pipeline. At step 510, the process receives the terms that were included in the question. The terms are received from memory area 320. These terms are stored in memory area 520.

At step 530, the process retrieves synonyms for the question's terms that were found from analysis of the QA pair data that was performed by the processing shown in FIG. 4. These identified synonyms are retrieved from memory area 360 and stored in memory area 520. At optional step 540, the process weights strong synonyms that were found from the QA pair analysis higher due to their apparent relevance in this domain. For example, if "leader" and "quarterback" were found to be synonyms in numerous instances, then this term-synonym (expression) pair would be weighted higher than other combinations that were identified but not encountered as many times in the QA pair data. This optional weighting data is also stored in memory area 520. At step 550, the process retrieves traditional synonyms for terms from data store 380. Again, these traditional synonyms are also stored in memory area 520.

Once the terms and synonyms have been established and stored in memory area 520, at step 560 the process selects the first passage from the set of identified passages stored in data store 330. At step 570, the process scores the selected passage using the terms from the question data (trigrams, etc.) as well as using the synonyms found in the QA pair data and also using traditional synonym data. These passage scores are stored in memory area 390. The process determines as to whether there are more identified passages yet to be processed (decision 580). If there are more identified passages yet to be processed, then decision 580 branches to the 'yes' branch which loops back to step 560 to select and process the next passage from the set of identified passages. This looping continues until all of the identified passages have been processed, at which point decision 580 branches to the 'no' branch exiting the loop. FIG. 5 processing thereafter ends at 595.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   receiving a question at a question-answering (QA) system, wherein the received question includes one or more terms, and wherein the received question pertains to a subject matter domain that is supported by the QA system;

selecting one of the terms from the received question;

selecting a plurality of expressions included in a plurality of question-answer pairs (QA pairs), wherein the QA pairs are ground-truths established in support of the subject matter domain;

for each of the selected expressions, in response to determining that the selected term and the selected expression are synonyms, identifying the selected expression as a synonym and incrementing a counter corresponding to the identified expression;

calculating a synonym strength corresponding to each of the identified expressions, wherein the calculating is based on a number of times each of the identified expressions is determined to be a synonym of the selected term; and utilizing the identified expressions in a QA pipeline that generates one or more candidate answers to the received question, wherein the utilizing comprises scoring a plurality of passages previously ingested by the QA system, wherein the scoring is based in part on use of the identified expressions, and wherein the scoring is further based on the synonym strength corresponding to each of the identified expressions.

2. The method of claim 1 wherein the scoring is further based on use of the selected term in the plurality of passages and use of traditional synonyms in the plurality of passages.

3. The method of claim 1 further comprising:
inhibiting use of a set of one or more of the identified expressions during the scoring in response to the synonym strength of the set of identified expressions failing to reach a threshold.

4. The method of claim 1 further comprising:
identifying a focus of the question, wherein the selected term is based on the identified focus.

5. An information handling system comprising:
one or more processors;
a memory coupled to at least one of the processors; and
a set of computer program instructions stored in the memory and executed by at least one of the processors in order to perform actions comprising:
receiving a question at a question-answering (QA) system, wherein the received question includes one or more terms, and wherein the received question pertains to a subject matter domain that is supported by the QA system;
selecting one of the terms from the received question;
selecting a plurality of expressions included in a plurality of question-answer pairs (QA pairs), wherein the QA pairs are ground-truths established in support of the subject matter domain;
for each of the selected expressions, in response to determining that the selected term and the selected expression are synonyms, identifying the selected expression as a synonym and incrementing a counter corresponding to the identified expression;
calculating a synonym strength corresponding to each of the identified expressions, wherein the calculating is based on a number of times each of the identified expressions is determined to be a synonym of the selected term; and
utilizing the identified expressions in a QA pipeline that generates one or more candidate answers to the received question, wherein the utilizing comprises scoring a plurality of passages previously ingested by the QA system, wherein the scoring is based in part on use of the identified expressions, and wherein the scoring is further based on the synonym strength corresponding to each of the identified expressions.

6. The information handling system of claim 5 wherein the scoring is further based on use of the selected term in the plurality of passages and use of traditional synonyms in the plurality of passages.

7. The information handling system of claim 5 wherein the actions further comprise:
inhibiting use of a set of one or more of the identified expressions during the scoring in response to the synonym strength of the set of identified expressions failing to reach a threshold.

8. The information handling system of claim 5 wherein the actions further comprise:
identifying a focus of the question, wherein the selected term is based on the identified focus.

9. A computer program product, the computer program product comprising a computer readable storage medium having program instructions embodied therewith, the program instructions executable by an information handling system to cause the information handling system to:
receive a question at a question-answering (QA) system, wherein the received question includes one or more terms, and wherein the received question pertains to a subject matter domain that is supported by the QA system;
select one of the terms from the received question;
select a plurality of expressions included in a plurality of question-answer pairs (QA pairs), wherein the QA pairs are ground-truths established in support of the subject matter domain;
for each of the selected expressions, in response to determining that the selected term and the selected expression are synonyms, identify the selected expression as a synonym and incrementing a counter corresponding to the identified expression;
calculate a synonym strength corresponding to each of the identified expressions, wherein the calculating is based on a number of times each of the identified expressions is determined to be a synonym of the selected term; and
utilize the expressions identified as synonyms in a QA pipeline that generates one or more candidate answers to the received question, wherein the utilizing comprises scoring a plurality of passages previously ingested by the QA system, wherein the scoring is based in part on use of the identified expressions, and wherein the scoring is further based on the synonym strength corresponding to each of the identified expressions.

10. The computer program product of claim 9 wherein the scoring is further based on use of the selected term in the plurality of passages and use of traditional synonyms in the plurality of passages.

11. The computer program product of claim 9 wherein the execution of the program instructions further cause the information handling system to:
identify a focus of the question, wherein the selected term is based on the identified focus; and
inhibit use of a set of one or more of the identified expressions during the scoring in response to the synonym strength of the set of identified expressions failing to reach a threshold.

\* \* \* \* \*